(No Model.)
P. McMAHON.
SHIELD FOR ORDNANCE.
No. 453,088. Patented May 26, 1891.
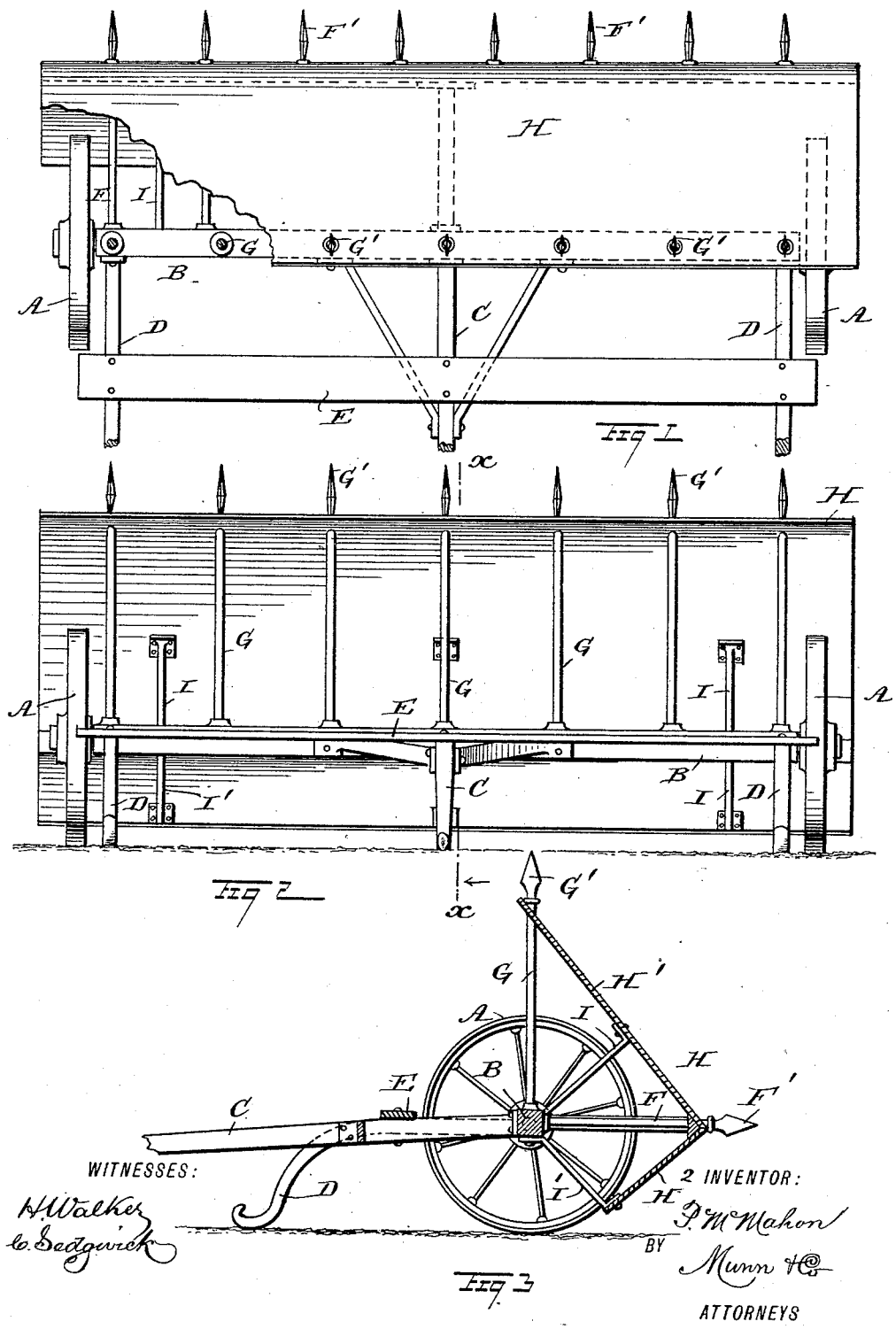

UNITED STATES PATENT OFFICE.

PATRICK McMAHON, OF MANCHESTER, MICHIGAN.

SHIELD FOR ORDNANCE.

SPECIFICATION forming part of Letters Patent No. 453,088, dated May 26, 1891.

Application filed November 24, 1890. Serial No. 372,476. (No model.)

*To all whom it may concern:*

Be it known that I, PATRICK McMAHON, of Manchester, in the county of Washtenaw and State of Michigan, have invented a new and Improved Ordnance-Shield, of which the following is a full, clear, and exact description.

The object of the invention is to provide a new and improved shield especially designed for military use, and which may be moved in any direction upon the field of battle and will serve as a protection to the rank and file against the attack of the enemy's infantry and cavalry.

The invention consists of a wheeled shield having angularly-arranged deflecting-plates.

The invention also consists in certain parts and details and combinations of the same, as will be fully described hereinafter, and then pointed out in the claims.

Reference is to be had to the accompanying drawings, forming a part of this specification, in which similar letters of reference indicate corresponding parts in all the figures.

Figure 1 is a plan view of the improvement with parts broken out. Fig. 2 is a rear view of the same, and Fig. 3 is a sectional side elevation of the same on the line $x\ x$ in Fig. 2.

The improved ordnance-shield is provided with two wheels A, supporting the axle B, from which extends rearward a tongue C, to which a team may be attached for moving the shield across the battle-field. From the axle, also, extend rearward the legs D, adapted to rest on the ground, so as to hold the shield in the proper position. A transverse plate E connects the legs and tongue with each other, the said plate serving as a resting-board for the parties to be protected by the shield. From the axle extend forward a series of arms F, and a like series of arms G extends vertically, as is plainly illustrated in the drawings. The horizontal and vertical arms F and G support the shield proper H, which is composed of the two angularly-arranged deflecting-plates H' and H², of which the former extends upward and rearward and the latter downward and rearward to within a few inches of the ground. Suitable braces I and I' may be arranged to strengthen the plates H' and H² from the axle B. The outer ends of the arms F and G project beyond the shield and are formed into spears F' and G', as is plainly shown in the drawings. It will be seen that by this construction the ordnance-shield can be moved forward or backward, or turned and locked in any desired position. A series of such ordnance-shields may be employed and arranged in a circle or in a parallelogram, or in any other suitable way for defense. The soldiers or other parties to be protected stand in the rear of the deflecting-plates H' and H², and they can rapidly move the shield forward in case of advance or draw the shield back in case of retreating. Bullets fired by the enemy and striking the deflecting-plates H' and H² glance upward when they strike the upper plate and downward when they strike the lower plate H², so that in either case no harm is done to the parties standing in the rear of the shield. The upper edge of the plate H' is such a suitable distance above the ground as to permit the parties standing in the rear of the shield to fire over the same into the enemy. The spears F' form a protection from attacking cavalry.

Having thus described my invention, I claim as new and desire to secure by Letters Patent—

1. An ordnance-shield consisting in a wheeled frame, an upward and rearward inclined armor-plate H, mounted on said frame, a lower armor-plate H², inclined downward and rearward from the lower edge of the upper plate, and braces connecting said frame and plates, substantially as set forth.

2. An ordnance-shield consisting in the axle B, wheels A, supports D, extending rearward and downward from the axle, a rest-bar connecting the said supports, a tongue or handle C, the upward and rearward and the downward and rearward inclined plates H' H² in front of the axle, and the braces I, connecting the said plates and axle, substantially as set forth.

3. An ordnance-shield comprising a wheeled frame, vertical bars or rods G, mounted thereon and terminating in spear-points G', horizontal forward-projecting rods or bars F, terminating in spear-points F', the upward and rearward and the downward and rearward inclined plates H' H², mounted on said frame with their meeting edges in rear of the points F', the upper edge of the plate H' being perforated for the passage of the bars or rods G, and the braces I for the said plates, substantially as set forth.

4. In an ordnance-shield, the combination, with a wheeled vehicle, of a shield supported thereon and provided with angularly-arranged plates and spears projecting from the front and top of the said deflecting-plates, substantially as shown and described.

PATRICK McMAHON.

Witnesses:
N. SCHMID,
ED. E. ROOT.